United States Patent [19]

Kato

[11] 4,398,428
[45] Aug. 16, 1983

[54] FLUID FLOW SENSOR
[75] Inventor: Yoshiaki Kato, Fujisawa, Japan
[73] Assignee: Nissan Motor Company, Limited, Kanagawa, Japan
[21] Appl. No.: 223,090
[22] Filed: Jan. 7, 1981
[30] Foreign Application Priority Data
  Jan. 10, 1980 [JP]  Japan ................................. 55-901
  Feb. 26, 1980 [JP]  Japan ............................... 55-23834
[51] Int. Cl.³ ............................................. G01F 1/70
[52] U.S. Cl. .................................. 73/861.05; 73/239
[58] Field of Search ................... 73/861.05, 239, 249, 73/250
[56] References Cited
U.S. PATENT DOCUMENTS

| 35,806 | 7/1862 | Aubin | 73/249 |
|---|---|---|---|
| 2,014,664 | 9/1935 | Nicholls | 73/250 |
| 2,772,664 | 12/1956 | Jones et al. | 73/239 |
| 3,344,667 | 10/1967 | Maltby | 73/239 |
| 3,605,741 | 9/1971 | Spencer | 73/861.05 |
| 3,657,925 | 4/1972 | Gross | 73/239 |

FOREIGN PATENT DOCUMENTS

| 593871 | 10/1947 | United Kingdom . |
|---|---|---|
| 979181 | 1/1965 | United Kingdom . |
| 2020353A | 11/1979 | United Kingdom . |

Primary Examiner—Herbert Goldstein
Attorney, Agent, or Firm—Lowe, King, Price & Becker

[57] ABSTRACT

A fluid flow sensor, according to the present invention, comprises a straight fluid passage having ports on both ends thereon. A ball member is disposed with in the straight fluid passage to move therealong. Detectors are provided in the fluid passage adjacent both ends thereof for detecting ball member reaching at the detector. A switching device for switching flow direction of the fluid in the straight fluid passage is responsive to detection of the ball member position of the detectors. A counter counts up the occurrence of switching of fluid flow directions.

7 Claims, 11 Drawing Figures

FLUID FLOW SENSOR

BACKGROUND OF THE INVENTION

The present invention relates generally to a fluid flow sensor for determining the velocity and/or the amount of fluid flowing therethrough, which is applicable to, for example, the fuel induction passage of an internal combustion engine to measure the amount of fuel supplied to the engine. More specifically, the invention relates to an improvement to a fluid flow sensor in use with a movable ball member which is moved by the fluid flow at a speed proportional to the fluid velocity.

Various fluid flow sensors for measuring fluid velocity and/or fluid amount flowing therethrough have recently been developed. Among the various types of fluid flow sensors, a fluid flow sensor employing a movable ball disposed within a fluid passage and moving at a speed corresponding to the fluid velocity is known. Such a fluid flow sensor is available on the market for use, for example, engines. engine mountable to an automotive vehicle and so on.

In the general construction of such conventional fluid flow sensors, the ball member is disposed within an annular fluid passage and moves in a circumferential direction. The fluid introduced into the fluid passage flows along the annular passage and moves the ball member therewith. On both sides of a portion of the passage, a photo-emitting member and a photo-sensitive member are provided in lateral alignment with respect to the circumferential axis of the passage. The ball member interrupts the light emitted from the photo-emitting member. These interruptions are counted up, and based on the counted value, the fluid velocity and/or amount is determined.

In such a conventional construction of the fluid flow sensor, the motion of the ball member is substantially affected by friction between the ball member and the internal periphery of the annular fluid passage. Due to this friction, the speed of the ball member is apt to be lower than the fluid velocity. As a result, this kind of fluid flow sensor does not respond so accurately to a change of fluid velocity, particularly in the range where the flow energy of the fluid is relatively small. When such a fluid flow sensor is added to the fuel induction passage of the internal combustion engine, the sensor has to respond to a wide range of fuel velocities, for example, while the engine operating condition is varied from idling position to full load position. However, within the range in which engine operating condition has a small variation, the sensor cannot accurately follow the variation of fuel velocity and/or the amount of fuel flow. Therefore, the accuracy and reliability of the measurement are substantially lower than that required.

SUMMARY OF THE INVENTION

Therefore, it is an object of the present invention to provide an improved fluid flow sensor in which is minimized the effect of friction between the ball member and the passage and which thereby is responsive to substantially small changes of the fluid velocity.

Another and more specific object of the present invention is to provide a fluid flow sensor in which the ball member is moved linearly along a straight fluid passage to minimize the effect of friction between the ball member and the inner periphery of the fluid passage.

To accomplish the above-mentioned and other objects, the fluid flow sensor, according to the present invention, comprises a straight fluid passage having ports on both ends thereof. A ball member is disposed within the straight fluid passage to move therealong. Detectors are provided in the face of the fluid passage adjacent to both ends thereof to detect the ball member reaching the detector. A switching means for switching the direction of fluid flow in the straight fluid passage is responsive to the detection of the ball member at each detector. A counter counts up the occurrences of switching of fluid flow direction.

In the preferred embodiment, the fluid passage and the switching means are received within a common housing and are connected with one another therewithin.

BRIEF DESCRIPTION OF THE DRAWINGS

The present invention will be better understood and become more apparent from the hereinafter given detailed description and from the accompanying drawings of the preferred embodiments of the present invention, which, however, should not be taken as limitative to the present invention but are for elucidation and explanation only.

In the drawings.

FURTHER DESCRIPTION OF THE PRIOR ART

Figure 1:
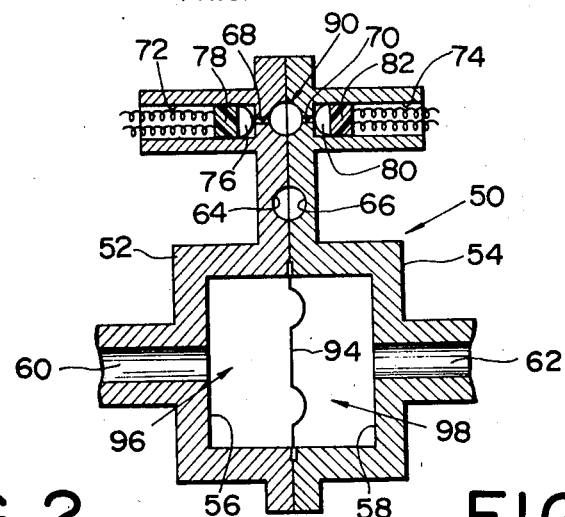
FIG. 1 is a transverse section of a conventional fluid flow sensor of typical construction.
Figure 2:
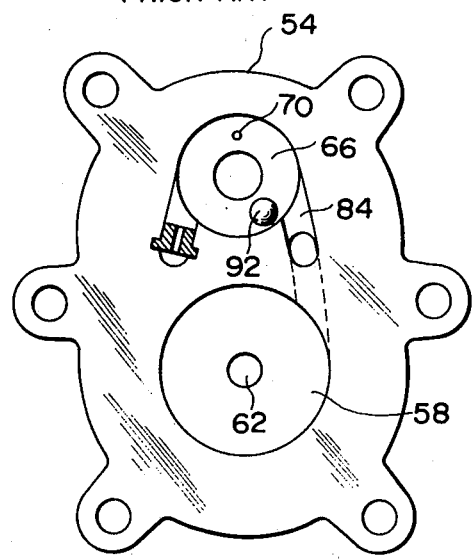
FIG. 2 is a front elevation of the fluid flow sensor housing consisting of one part of the sensor of FIG. 1.
Figure 3:
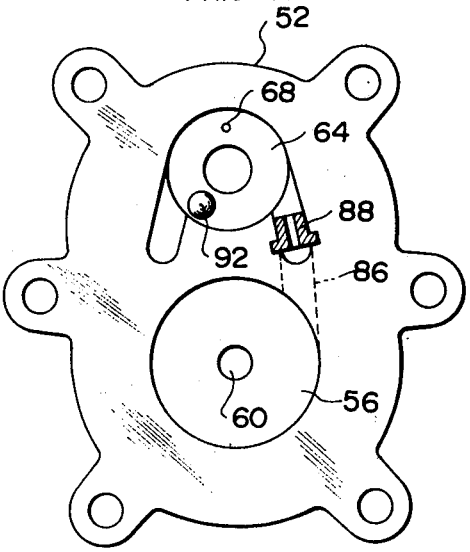
FIG. 3 is a front elevation of the fluid flow sensor housing consisting of the other part of the sensor of FIG. 1.

For the purpose of better understanding the gist and advantages of the fluid flow sensor according to the present invention, herebelow is given a reasonably detailed description of one typical construction of a conventional fluid flow sensor with reference to FIGS. 1 to 3 of the accompanying drawings.

As shown in FIGS. 1 to 3, a sensor housing 50 comprises two parts 52 and 54 which are formed symmetically relative to one another. Each part 52, 54 has a circular groove 56, 58 which communicates with the inlet port 60 and the outlet port 62 respectively. Further, each part 52, 54 is formed with a sectionally semicircular annular groove 64, 66. The grooves 64 and 66 are formed with conduits 68, 70 communicating with bores 72 and 74 respectively. In bore 72 is placed a photo-emitting member 76 with insulator 78 and in bore 74 is placed a photo-sensitive member 80 with insulator 82. The annular groove 64 is connected to the recess 56 through a passage 84 and the annular groove 66 is connected to the recess 58 through a passage 86. An orifice 88 is disposed within the passage 86, which serves as a means for preventing the fluid flowing in the other direction.

On assembling, the conduits 68 and 70 are located in alignment so that the light emitted from the photo-emitting member 76 can be received by the photo-sensitive member 80 therethrough. The semi-circular annular grooves 64 and 66 are coupled together to form a sectionally circular annular fluid passage 90. A ball member 92 made of a material having a specific gravity which is substantially the same as that of the fluid is movably disposed within the fluid passage. Between the circular grooves 56 and 58 which are opposed to one another, a diaphragm 94 is interposed in order to partition therebetween to form therein an inlet chamber 96 and outlet chamber 98 and to absorb variations of fluid pressure.

The fluid is introduced within the sensor housing through the inlet port 60. In the sensor housing, the fluid flows through the inlet chamber 96, the passage 86, the orifice 88, the annular fluid passage 90, the passage 84, the outlet chamber 98 and the outlet port 62.

The ball member 92 is moved along the annular fluid passage 90 together with the fluid flow. During the motion, the ball member 92 interrupts the light emitted from the photo-emitting member 76. Responsive to this interruption, the photo-sensitive member 78 generates a counting signal to be fed to a counter (not shown). The counter counts up the counting signal. Thus, fluid velocity and/or amount flowing through the fluid flow sensor can be calculated based on the counter value.

In the conventional fluid flow sensor described, since the fluid flows through an annular fluid passage which decreases the fluid velocity by friction and collision between the fluid and inner periphery thereof, the fluid velocity and/or amount flowing through the annular passage appears relatively lower than the actual value. In addition, the ball member is apt to be interfered with in its motion due to friction with the inner periphery of the passage. Thus, such conventional fluid flow sensors do not have very high response characteristics, particularly to relatively small changes of fluid velocity. This leads to low accuracy and reliability of the sensor.

DESCRIPTION OF THE PREFERRED EMBODIMENT

Referring now to the drawings FIGS. 4 through 10, there are illustrated a preferred embodiments of a fluid flow sensor according to the present invention. Although hereinafter are illustrated specific embodiments in relation to a fluid flow sensor for determining the amount of fuel supplied through a fuel passage of an automotive vehicle, the fluid flow sensor according to the present invention is not specified thereby and is also applicable for determining any fluid, particularly liquid fluid, amount flowing therethrough.

Figure 4:
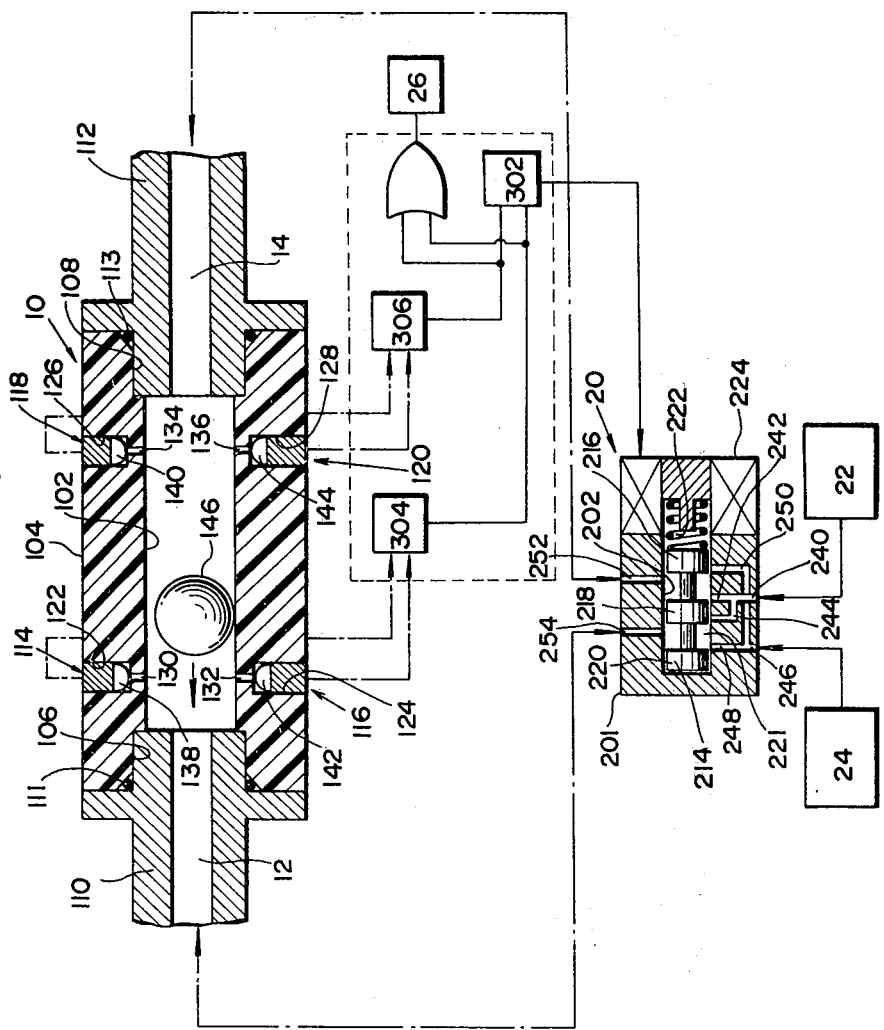
FIG. 4 is a diagramatical illustration of a fluid flow sensor according to the present invention, in which is shown the fundamental construction of the invention and in which the electric circuit thereof is shown in the form of a block diagram.

FIG. 4 shows a first embodiment of the fluid flow sensor according to the present invention, in which the electric circuit has been shown in block-form. The fluid flow sensor generally comprises a fluid flow sensitive means 10 into which is introduced the fluid and which is responsive thereto, a switching valve means 20 which is cooperatively connected with the fluid flow sensitive means 10 and is interposed between a fluid source 22 and the fluid flow sensitive means, and an electric circuit for calculating the fluid amount in a unit period.

Generally, the fluid flow sensitive means 10 comprises a cylinder bore 102 formed within a sensor housing 104. The bore 102 is formed as a straight passage and is open at both ends 106 and 108 thereof. On both ends 106 and 108 are tightly fitted end fittings 110 and 112 with annular sealing members 111 and 113, through which bore 102 communicates with a fluid passage, i.e. the fuel passage connecting the fluid source 22, such as the fuel pump, and a fluid chamber 24, such as the float chamber of a carburetor. The end fittings 110 and 112 respectively serve for the sensor as first and second ports 12 and 14 for introducing and draining the fuel flowing through the fuel passage. Adjacent each end 106 and 108, the housing 104 is formed with pairs of stepped openings 114 and 116 and 118 and 120. Each of the openings has a larger diameter in the outer section 122, 124, 126 and 128 thereof. Each pair of openings 114 and 116, and 118 and 120 are aligned radially to the cylinder bore 102. The pairs of inner sections 130 and 132, and 134 and 136 respectively open to the bore 102 and oppose to one another.

In the outer sections 122 and 126 of the openings 114 and 118, light emitting elements 138 and 140 such as photo-emitting diodes are received, and in the outer sections 124 and 128 of the openings 116 and 120 are received photo-sensitive elements 142 and 144 such as photo-sensitive transistors. The light emitting elements 138 and 140 respectively and continuously emit light through the inner sections 130 and 134. The photo-sensitive elements 142 and 144 are respectively connected to a switching circuit 302 through amplifiers 304 and 306.

A movable element 146 such as a ball member as shown in the FIG. 4 is movably received within the cylinder bore 102. In the preferred embodiment, the movable element 146 is a ball member having a diameter slightly smaller than that of the cylinder bore 102. Further, the ball member 146 is made of a material having a specific gravity which is the same as that of fuel.

A switching valve means 20 is interposed within a fuel passage to introduce or drain the fuel from the fluid flow sensitive means 10. The switching valve means 20 is responsive to a signal generated in the switching circuit 302 which is fed therefrom to switch the flow direction of the fuel between a first direction from the end 106 to 108 and a second direction from end 108 to 106. As shown in FIG. 4, the switching valve means 20 comprises a housing 201 with a cylinder bore 202 and a spool valve member 214 disposed within cylinder bore 202. The spool valve mumber 214 is urged toward the bottom of the cylinder bore 202 by a spring 222. An electromagnetic actuator 224 is provided at the end of the cylinder bore 202 remote from the bottom thereof. The actuator 224 is electrically connected with the switching means 302 which energizes and deenergizes the former. The cylinder bore 202 communicates with an inlet port 240 through fluid passages 242 and 244. Likewise, the cylinder bore 202 communicates with an outlet port 246 through fluid passages 248 and 250. The inlet port 240 and the outlet port 246 respectively communicate with fluid source 22 and fluid chamber 24. On the other hand, the cylinder bore 202 communicates with both end fittings 110 and 112 through fluid passages 254 and 252 respectively.

The spool valve 214 is formed with lands 216, 218 and 220 respectively defining annular grooves 219 and 221 therebetween. The lands 216 and 220 are located so that either one of them closes the corresponding fluid passage 250 and 248 respectively depending on the position of the spool valve 214, and remaining fluid passage are opened to communicate with each corresponding annular groove 219 or 221. On the other land, the land 218 selectively closes either one of fluid passage 242 and 244 and establishes communication with the annular groove 219 and 221 corresponding thereto. Namely, in the deenergized position of the actuator 224 and therefore the spool valve 214 being abutting on the bottom of the cylinder bore 202, the inlet port 240 communicates with the cylinder bore 202 through the fluid passage 242 and the cylinder bore 202 communicates with the outlet port 246 through the fluid passage 248. At this time, the fluid passages 244 and 250 are closed by respectively corresponding lands 218 and 216. Thus the fluid introduced from the fluid source 22 flows through the inlet port 240, the fluid passage 242, the annular groove 219, the fluid passage 252, the cylinder bore 102, fluid passage 254, the annular groove 221, the fluid passage 248 and the outlet port 246 to the fluid chamber 24. Thereby, the fluid in the cylinder bore 102 flows from right to left in the drawing. By the fuel flow within the cylinder bore 102, the ball member 146 is moved in the first direction and finally reaches the opposing inner sections 130 and 132 of the openings 114 and 116. Thereby, the light emitted from the light emitting element 138 is interrupted. Responsive to the interruption of the light, the photo sensitive element 142 generates a signal to be fed to the switching circuit 302 through the amplifier 304. Responsive to the signal fed from the photo sensitive element 142, the switching means 302 generates a signal which energizes the actuator 224. The spool valve 214 is pulled toward the actuator 224 against the spring force. In this spool valve position, the groove 219 communicates with the fluid passage 250 and the groove communicates with the fluid passage 244. At this time, the fluid passages 242 and 248 are respectively closed by the lands 218 and 220. Thereby, the fluid flow direction alternates to move the ball member 146 in the opposite direction, viewed from left to right.

The alternation of the flow direction is counted up by a counter 26 connected with respective amplifier 304 and 306 through a OR gate. Therefore, the counter is responsive to outputs of the photo-sensitive element 142 and 144. It should be noted that, in the preferred construction, the counter becomes operative when the switching valve means is switched to energized position and counts up the occurrences of energization of the actuator 224.

Since the occurrences of turning on and off actuator 224 are proportioned to the fluid velocity, the fluid amount can be calculated by multiplying the counted value by a predetermined constant.

The second preferred embodiment of the present invention in FIGS. 5 to 10. In the hereafter given description, the corresponding parts or elements to those of FIG. 4 are represented by the same reference numerals to avoid unnecessary confusion.

Figure 5:
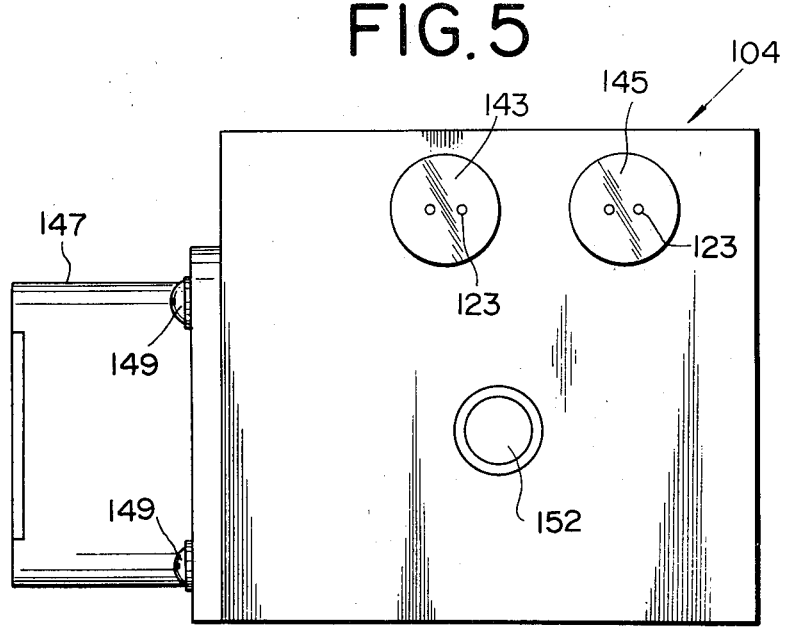
FIG. 5 is a front elevation of a preferred embodiment of the fluid flow sensor according to the present invention.

FIG. 5 shows a front elevation of the second preferred embodiment of the fluid flow sensor according to the present invention. The fluid flow sensitive means 10 and the switching means 20 are constructed and housed in a single sensor housing 104. An actuator housing 147 is sealingly fitted to housing 104 by screws 149. The housing 104 is formed with an inlet port 150 and an outlet port 152. The inlet port 150 communicates with the fluid source (e.g., fuel pump 22) but is located on the opposite side to that shown in FIG. 5. The outlet port 152 communicates with the fluid chamber such as the float chamber of the carburetor 24.

Figure 6:
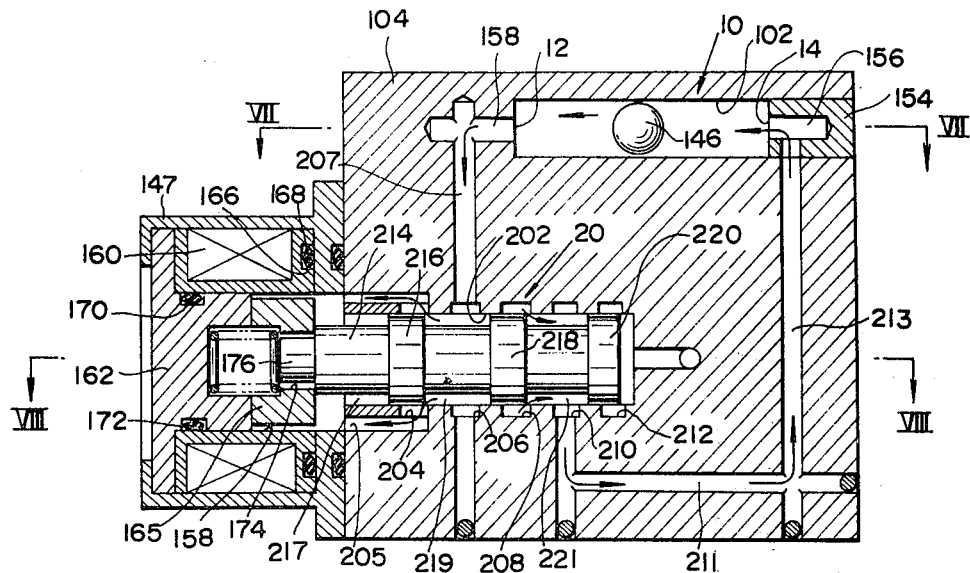
FIG. 6 is a transverse section of the fluid flow sensor of FIG. 5, which shows the position of the actuator when in the inoperative position.
Figure 8:
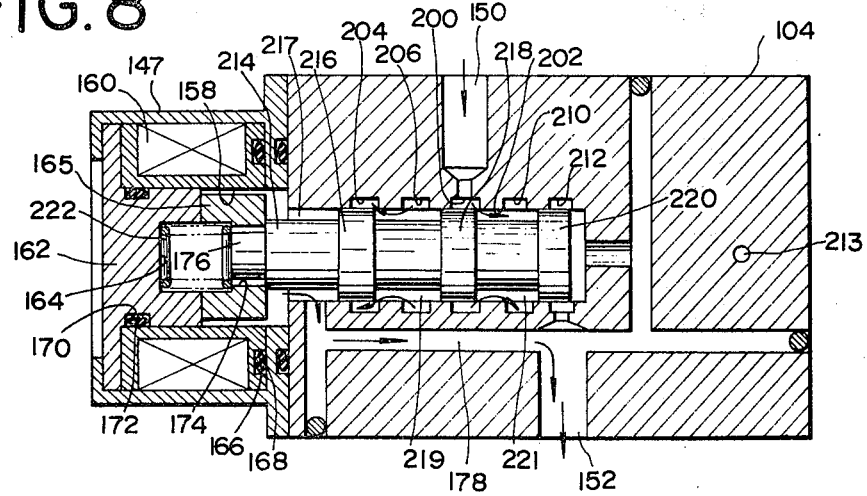
FIG. 8 is a section of the fluid flow sensor taken along line VIII—VIII of FIG. 6.

FIGS. 6 and 8 show sectional views of the fluid flow sensor of FIG. 5. In the sensor housing 104, the fluid flow sensitive means 10 is formed adjacent the top thereof and in parallel relationship therewith. The cylinder bore 102 of the fluid flow sensitive means 10 is formed transversely in housing 104 and the outer end of bore 102 is closed with an end fitting 154 formed with a fluid passage 156. The other end of bore 102 communicates with a fluid passage 158 which is integrally formed with the bore 102. Thus, the cylinder bore 102 is provided with the first and second ports 12 and 14 on both ends therewith. In the cylinder bore 102 is disposed a ball member 146 made of a material having a specific gravity which is substantially the same as that of the fuel.

Figure 7:
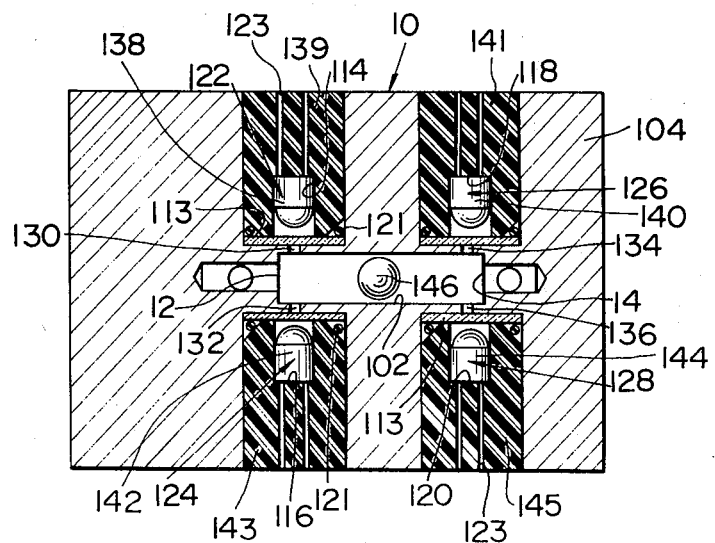
FIG. 7 is a section of the fluid flow sensor taken along line VII—VII of FIG. 6.

As shown in FIG. 7, sensor housing 104 is further formed with two pairs of stepped openings 114 and 116, and 118 and 120. Each pair of openings 114, 116, and 118, 120 are axially aligned in the lateral direction with respect to the longitudinal axis of the cylinder bore 102. Openings 114, 116, 118 and 120 respectively include outer sections 122, 124, 126 and 128 and inner sections 130, 132, 134 and 136. The outer sections 122, 124, 126 and 128 have a larger diameter than that of inner sections 130, 132, 134 and 136 which respectively open to the cylindrical bore 102. A transparent member 115 such as a lens is placed at the bottom of each outer section 122, 124, 126 and 128.

In the outer sections 122 and 126 respectively of the opening formed in the upper half in FIG. 7, photo-emitting members 138 and 140 with insulators 139 and 141 respectively are received. Between the insulators 139 and 141 and the transparent members 115, sealing members 121 are interposed to liquid-proof then elastically. In the outer sections 124 and 128 respectively formed in the lower half of FIG. 7, photo-sensitive members 142 and 144 with insulators 143 and 145 are received, liquid-proofed by sealing members 121. Each pair of openings 114 and 116 and 118 and 120 are respectively located adjacent each end of the cylinder bore 102.

Each insulator 139 and 141 is formed with an elongated opening 123 through which leads (not shown) for connecting the photo-emitting members 138 and 140 to a electrical source such as the vehicle battery are inserted. Likewise, the photo-sensitive members 142 and 144 are connected with the switching circuit 302 of FIG. 4 through leads (not shown) which are inserted through elongated openings 123 formed in the insulators 143 and 145.

In practice, any suitable photo-emitting members and photo-sensitive members can be used in the sensor of the present invention. However, a photo-emitting diode and photo-sensitive transistor are preferred in the shown embodiment of the present invention.

Now, follows are detailed explanation of the switching valve means 20 with reference to FIGS. 6 and 8.

The cylinder bore 202 is formed in the sensor housing 104 in parallel with the cylinder bore 102. On the inner periphery of the cylinder bore 202 are formed annular grooves 204, 206, 208, 210 and 212. As shown in FIG. 6, annular groove 204 communicates with the passage 205, the outer ends of which are respectively open to the side surface of the sensor housing 104. The annular groove 206 communicates with the fluid passage 158 through a vertical passage 207 and the annular groove 210 communicates with the fluid passage 156 through horizontal and vertical passages 211 and 213. The annular groove 208 communicates with the fluid source 22 through the inlet port 150 and the annular groove 212 communicates with the fluid chamber 24 through the outlet port 152.

The valve member 214 is slidably disposed with the cylinder bore 202. The valve member 214 is formed with lands 216, 218 and 220 extending in the circumferential direction and apart from one another. The lands 216, 218 and 220 separate annular grooves 217, 219 and 221 on the outer surface of the valve member 214. As seen from FIGS. 6 and 8, each land 216, 218 and 220 is wide enough to close each of the annular grooves 204, 206, 208, 210 or 212 when placed against one of them. On the other hand, each groove 217, 219 and 221 is wide enough to communicate between two adjacent annular grooves of the inner periphery of the cylinder box 102.

The actuator housing 147 contains an internal chamber 158. An annular electromagnetic actuator 160 is secured on the inner periphery of the actuator housing 147 with a magnetic core 162. The magnetic core 162 is formed with a bore 164 at the axial center of the inner end thereof. One end of the bias spring 222 is received in the bore 164 and the other end of the spring abuts an armature 165 disposed in the internal space and being axially movable to and fro with respect to the core 164. The inner surface of the actuator 160 is formed with an annular groove 166 for receiving therein an annular sealing member 168. Likewise, an annular groove 170 for receiving an annular sealing member 172 is formed on the circumference of the core 162. The sealing members 168 and 172 act cooperatively to liquid-proof the achrator. The armature 165 is formed with a central opening 174 which receives the end 176 of the valve member 214 so as to move the latter against the spring with the motion of the armature.

Figure 9:
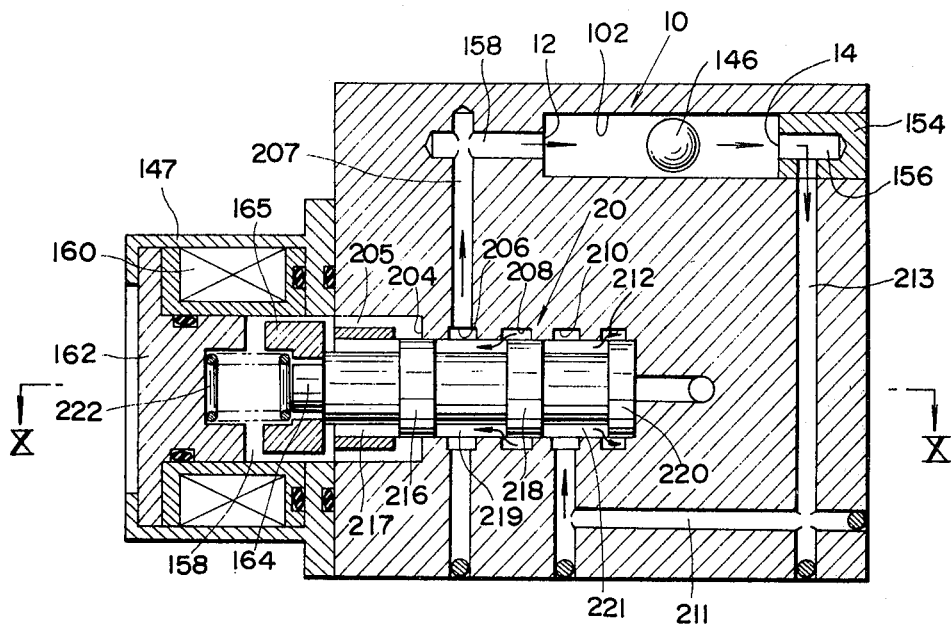
FIG. 9 is a similar view to FIG. 6, but showing the position of the actuator when in the operative position.
Figure 10:
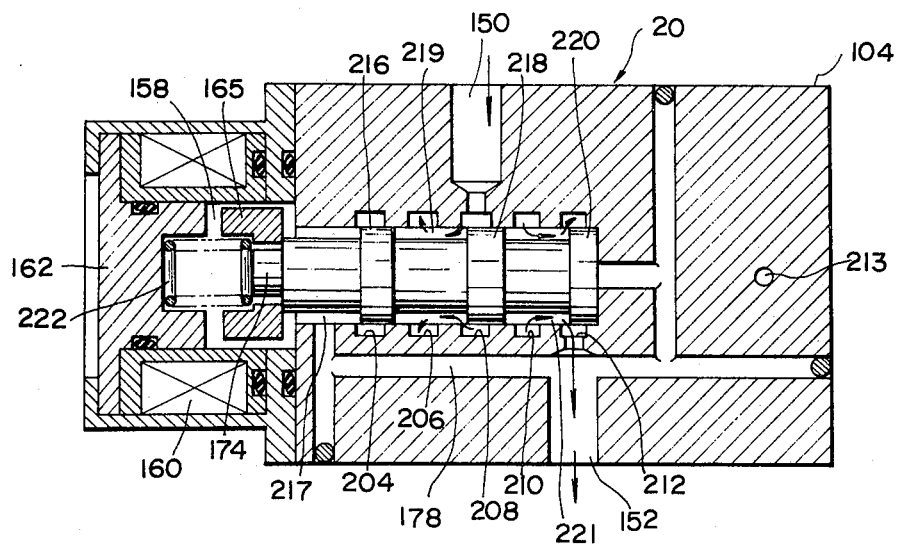
FIG. 10 is a section of the fluid flow sensor taken along line X—X of FIG. 9.

Now follows a description of to FIG. 6 and FIGS. 8 to 10 in which are illustrated different operational positions of the fluid sensor. FIGS. 6 and 8 shows a position of the sensor in which the valve member 214 is pulled toward the actuator 160 by the activation of the actuator. In the position, the groove 219 establishes the communication between the grooves 204 and 206 and the groove 221 establishes the communication between grooves 208 and 210. On the other hand the groove 217 establishes the communication between the groove 204 and the passages 204 and 178. The fuel supplied from the fuel tank as the fluid souce through the fuel pump 22 flows through the inlet port 150, the annular groove 208, the spool valve 214, the annular groove 210, the horizontal passage 211, the vertical passage 213, the fluid passsage 156, the cylinder bore 102, the vertical passage 207, the spool valve 214, the passage 205, the internal chamber 158 of the actuator housing 147, a horizontal passage 178 and the outlet port 152 to the working chamber such as the carburetor 24. Therefore, the fuel introduced into the cylinder bore 102 flows from the second port 14 to the first port 12. By the fluid pressure of the fuel flowing through the cylinder bore 102, the ball member 146 is moved toward the first port 12. During the movement, the ball member 146 interrupts the light emitted from the photo-emitting member 138 through the inner section 130 of the opening 114. Responsive to the interruption of the light, the photosensitive member 142 operates to generate an output. The output of the photo-sensitive member 142 is transmitted to the switching circuit 302 through the amplifier 304. The switching circuit 302 comprises of a flip-flop, for example. Responsive to the output signal of the photo-sensitive member 142, the switching circuit 302 operates to stop the supply of power to the actuator 160 to make it deenergized. Thereby, the spool valve 214 is urged toward the bottom of the cylinder bore 202 by the spring force applied from the return spring 222. FIGS. 9 and 10 show the position in which the inner end of the valve member 214 abuts the bottom of the cylinder bore 202. In this position, the groove 219 establishes the communication between the grooves 206 and 208 and the groove 221 establishes the communication between the grooves 210 and 212. The fuel introduced into the sensor through the inlet port 150 flows through the spool valve 214, the annular groove 206, the vertical passage 207, the fluid passage 158, the cylinder bore 102, the fluid passage 156, the vertical passage 213, the horizontal passage 211, the annular groove 210, the spool valve 235, the annular groove 212 and the outlet port 152. Thus, fuel in cylinder bore 102 flows from first port 12 to second port 14. Ball member 146 moves toward the second port 14 to interrupt the light emitted from the photo-emitting member 140 through the inner section 134 of the opening 118. The photo-sensitive member 144 then responds to the interruption of the light from the photo-emitting member 140 and generates an output signal. The output signal of the photo-sensitive member 144 is fed to the switching circuit 302 through the amplifier 306. The switching circuit 302 responds to the output signal of the photo-sensitive member 144 and becomes the operative. By this, electric power is supplied to the actuator 224 to electromagnetically pull the armature 165 together with the valve member 214 toward the actuator.

The switching circuit 302 further generates a counter pulse to be fed to the counter circuit 26 which counts up the number of these counter pulses. Since the number of occurrences of the alternation of flow direction of the fuel in the cylinder bore 102 is proportional to the flow velocity of the fuel in the cylinder bore, by counting up the counter pulses and thus counting the occurrence of the alternation of flow direction within a unit time, the amount of fuel flowing therethrough can be obtained by arithmetic operation by a constant which is determined according to the diameter of the cylinder bore 102 and other variables.

Figure 11:
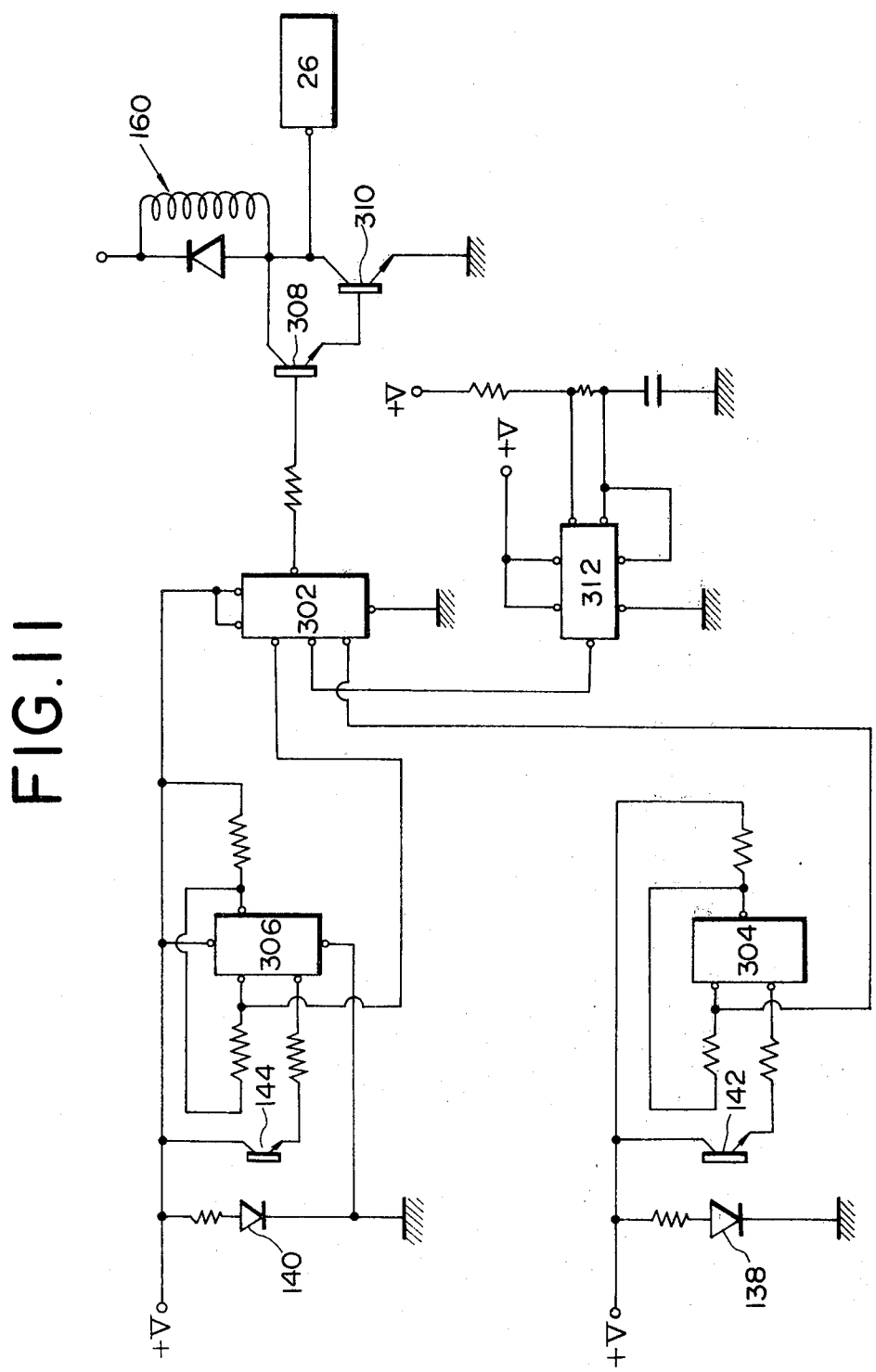
FIG. 11 is a circuit diagram of a preferred embodiment of the electric circuit of the fluid flow sensor, which corresponds to the circuit shown in block form in FIG. 4.

Referring to FIG. 11, there is illustrated a preferred embodiment of the electric circuit of the fluid flow sensor. The photo-emitting diode 138 is connected to the vehicle battery, and the photo-sensitive transistor 142 is an N-P-N transistor which is connected to the vehicle battery at the collector electrode and to the amplifier 304 at the emittor electrode. Likewise, the photo-emitting diode 140 is connected to the vehicle battery, and the photo-sensitive transistor 144 is an N-P-N transistor which is connected to the vehicle battery at the collector electrode and to the amplifier 306 at the emittor electrode. The amplifiers 304 and 306 are respectively connected to the J-terminal and K-terminal of the switching circuit comprising the JK flip-flop 302.

In this construction, the photo sensitive transistors 142 and 144 are in the off position when receiving the light from the photo-emitting diodes 138 and 140. If the ball member 146 moves into the clearance between each pair of photo-emitting diodes 138 and 142, and 140 and 144, and one of the photo-sensitive transistors the transistors 142, 144 turns on to output signal an output from the emitter electrode thereof. The flip-flop 302 responds to the output signal from the amplifier 304 to become inoperative and responds to the output of the amplifier 306 to become operative. Therefore, by the to-and-fro motion of the ball member 146, the flip-flop is repeatedly switched on and off. The counter 26 is connected to the flip-flop 302 outputs which is outputted in operative position thereof and fed to the counter through N-P-N transistors 308 and 310. The transistors 308 and 310 consist an AND gate. As shown in FIG. 11, the base electrode of the transistor 308 is connected to the flip-flop 302 and the emitter electrode thereof is connected to the base electrode of the transistor 310. The counter 26 is connected to the collector electrode of the transistor 310.

The collector electrodes of the transistors 308 and 310 are connected to the electromagnetic coil of the actuator 160. Therefore, if the flip-flop 302 is inoperative, the power is not supplied to the electromagnetic coil and thus the actuator is kept in its deactivated position. On the other hand, if the flip-flop 302 becomes operative, power is supplied to the electromagnetic coil to activate the actuator 160. Therefore, by the foregoing motion of the ball member 146, the actuator 160 repeatedly alternates between operative and inoperative positions.

In the preferred embodiment, there is provided a clock generator 312 comprising a timer IC. The clock generator is connected to the flip-flop 302 to feed thereto a timing pulse. The flip-flop 302 is switched between operative and inoperative positions in response to the timing pulse. Namely, unless the timing pulse is not inputted, the flip-flop 302 is kept inoperative even if the output from the amplifier 306 is inputted. This serves to ensure the sensor operation.

What is claimed is:

1. A fluid flow sensor to measuring fluid velocity and/or amount flowing therethrough, comprising:
   a sensor housing;
   a fluid passage formed in said housing with a substantially straight passage portion for containing a fluid operable to flow alternately in first and second directions therethrough;
   a ball member movably disposed within said fluid passage;
   pairs of photo sensitive sensors respectively provided in said housing, and sealing means to prevent liquid contact of fluid in the passage with the sensors but allowing a light path to project into the passage to sense the ball position, each pair of said photo sensitive sensors being located adjacent opposite ends of said fluid passage, and each sensor pair being responsive to and interrupted by said ball member flowing towards a corresponding end of said fluid passage to produce a sensor signal;
   a fluid flow direction switching means for switching flow directions of the fluid between said first and second directions, said fluid flow direction switching means including an actuator variable between a first position causing the fluid to flow in said first direction and a second position in which the fluid flow in said second direction, and a flip-flop associated with said actuator for varying the position thereof between said first and second positions, said flip-flop being responsive to said sensor signal to vary its position between a set position and a reset position which correspond to first and second positions of said actuator respectively; and
   a counter means responsive to occurrence of said sensor signal generated by one of said sensor pairs and thereby to set/reset switching in said flip-flop, velocity and/or amount.

2. A fluid flow sensor as set forth in claim 1, wherein said switching means comprise a valve member movably disposed within a cylinder bore, a spring urging said valve member toward the bottom of said cylinder bore and said actuator for urging said valve member in the direction opposite to the direction applied by the spring force, the fluid in said fluid passage flows in first direction when said valve member is positioned in a first position with the spring force and flows in second direction when said valve member is positioned in second position by said actuator, said actuator is responsive to a first sensor signal to urge said valve member and positions the same in second direction and responsive to a second sensor signal to become inoperative to position said valve member in the first position.

3. A fluid flow sensor as set forth in claim 1, wherein said ball member is made of a material having substantially the same specific gravity as that of the fluid to be measured the velocity and/or amount thereof.

4. A fluid flow sensor as set forth in claim 1, wherein said fluid flow passage has first and second ports adjacent said opposite ends thereof, which ports are respectively connected to a fluid source and said fluid flow direction switching means comprises a valve interpositioned between both ports and said fluid source and selectively establishing communication between one of said ports and said fluid source responsive to said sensor signal.

5. A fluid flow sensor as set forth in claim 1, wherein said pair of sensors each comprises a photo emitting member and a photo sensitive member, which photo emitting member transmits a photo beam to said photo sensitive member and said photo sensitive member is responsive to interruption of said photo beam to produce said sensor signal.

6. A fluid flow sensor for measuring fluid velocity and/or amount flowing therethrough, comprising:
   a sensor housing
   a fluid passage formed in the housing with a substantially straight fluid passage portion therein for containing a fluid operable to flow alternately in first and second directions therethrough;
   a ball member movably disposed within said fluid passage;
   pairs of photo sensitive sensors respectfully provided adjacent opposite ends of said fluid passage, each sensor pair being responsive to and interrupted by said ball member flowing towards a corresponding end of said fluid passage to produce a sensor signal;
   a fluid flow direction switching means for switching flow directions of the fluid between said first and second directions, said fluid flow direction switching means including an actuator variable between a first position causing the fluid to flow in said first direction and a second position in which the fluid flows in said second direction, and a flip-flop associated with said actuator for varying the position thereof between said first and second positions, said flip-flop being responsive to said sensor signal to vary its position between a set position and a reset position which correspond to first and second positions of said actuator respectively;

a counter means responsive to occurrence of set/reset switching in said flip-flop, for counting said occurrences to measure fluid velocity and/or amount;

said housing further including a pair of openings located at each end of the straight passage portion and being axially aligned in a lateral direction with respect to the longitudinal axis of the straight passage portion, said sensors being respectively mounted in each opening, a plurality of ports respectively extending between each opening and the straight passage portion to enable a beam emitted from the sensor to scan a preselected area in the straight passage portion to detect the ball, a substantially transparent member positioned between one sensor in each pair and the passage, and sealing means for sealing and insulating each sensor in its respective opening, thereby isolating the sensor from fluid contact while enabling said sensors to detect ball position through the transparent member.

7. The flow sensor of claim 6 wherein said sensor housing also contains part of said switching means and being further formed with passage means operatively interconnecting the straight passage and switching means, and an actuator housing attached directly to the sensor housing to form an integral unit therewith, said actuator housing containing the actuator acting directly upon the switching means in the sensor housing.

* * * * *